United States Patent [19]

Repski

[11] 4,186,805

[45] Feb. 5, 1980

[54] GROUND WORKING IMPLEMENT

[76] Inventor: Pete Repski, Box 30, Craik, Saskatchewan, Canada

[21] Appl. No.: 910,218

[22] Filed: May 30, 1978

[51] Int. Cl.² ............................................. A01B 19/04
[52] U.S. Cl. ................................. 172/248; 172/310; 172/482; 172/484; 172/474
[58] Field of Search ............... 172/482, 310, 311, 462, 172/474, 488, 497, 248

[56] References Cited

U.S. PATENT DOCUMENTS

| 600,662 | 3/1898 | Whipple | 172/310 |
|---|---|---|---|
| 646,774 | 4/1900 | Whipple | 172/310 |
| 2,694,890 | 11/1954 | Gooley | 172/482 |
| 3,155,168 | 11/1964 | Telecky | 172/484 |
| 3,299,965 | 1/1967 | Sokolik | 172/310 |
| 4,049,061 | 9/1977 | Lely | 172/248 |
| 4,102,404 | 7/1978 | Krammer | 172/679 |

*Primary Examiner*—Richard J. Johnson

*Attorney, Agent, or Firm*—Stanley G. Ade

[57] ABSTRACT

A plurality of ground working sections such as cultivator sections, are flexibly connected together and operatively connected to a hitch pole assembly. Each section is supported upon a pair of castor wheels mounted on a fore and aft beam pivotally connected to the front and rear of the frame members. The sweeps or cultivators move in an arc via hydraulic or mechanically operated rock shafts and the depth control is by means of controlling the pivotal movement of the fore and aft beams. This also permits the penetration angle of the sweep or cultivator to be preset and maintained. For transport, the draw pole is raised and the implement is towed by one end thereof with the castor wheels automatically aligning with the direction of travel thus eliminating folding or raising of sections and permitting practically any length of cultivator or ground working implements to be assembled.

14 Claims, 5 Drawing Figures

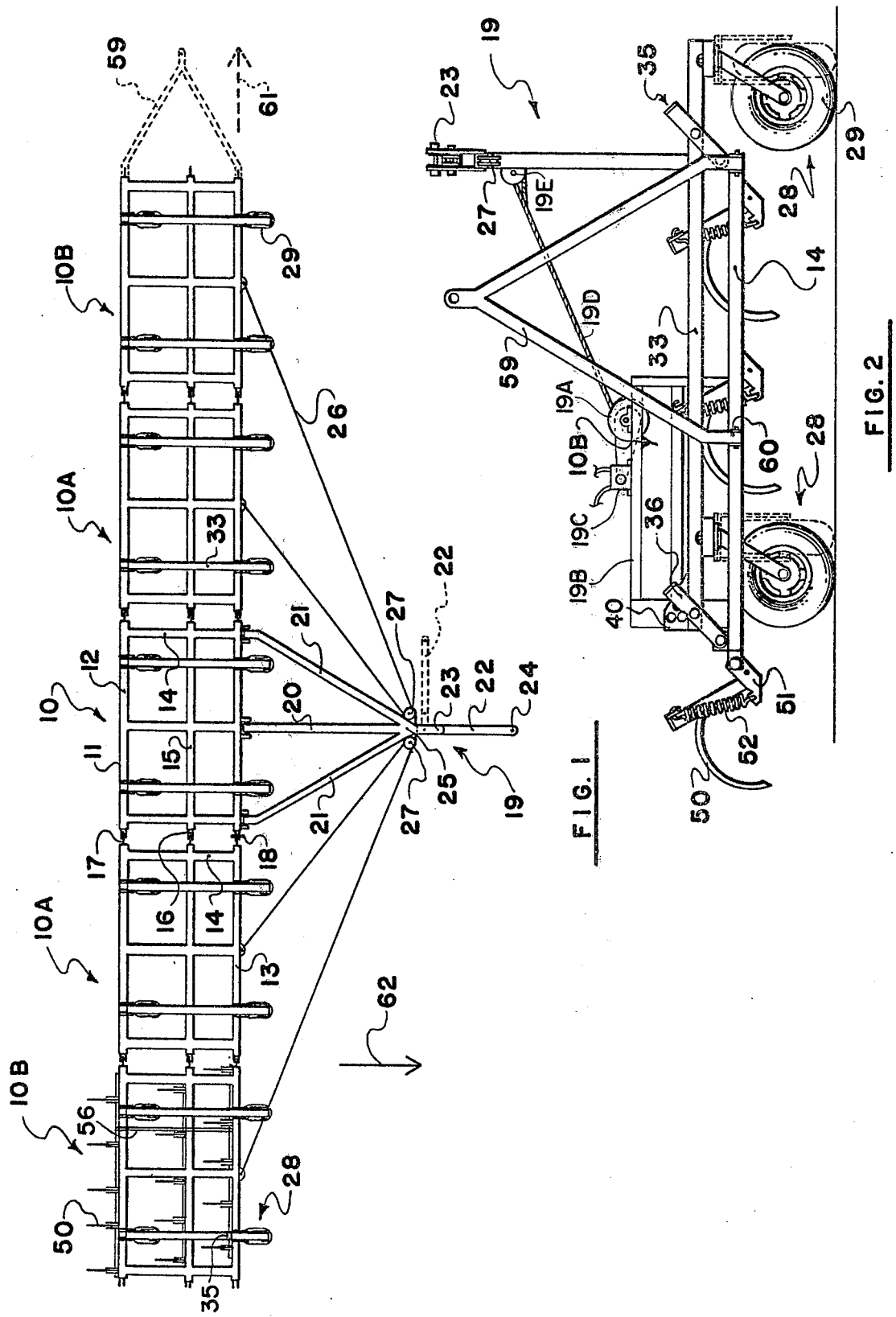

GROUND WORKING IMPLEMENT

BACKGROUND OF THE INVENTION

This invention relates to new and useful improvements in ground working implements, particularly implements such as duckfoot cultivators, sweep-type cultivators and chisel-plow type cultivators. However, although the drawings and description illustrate and describe a chisel-plow type cultivator, nevertheless it should be appreciated that the invention is not limited to this particular type of ground working implement.

Cultivators or the like normally comprise a center section with a plurality of wing sections pivotally connected upon each side of the center section and these wing sections are normally folded upwardly when it is desired to transport the implement along a road allowance or the like. It will be appreciated that there is a limit to the width of machine that can be built due to the difficulty of folding more than one or two sections relative to the center section. Furthermore, hydraulics and/or winches are used to raise and lower these wing sections which adds to the cost of manufacture and to difficulties of maintenance.

SUMMARY OF THE INVENTION

With present day heavy duty tractors and the trend towards the use of relatively wide cultivating implements, the present device overcomes difficulties inherent with conventional construction by providing a ground working implement comprising in combination a center section and at least two further sections articularly connected one upon each side of said center section for relative movement one with the other in at least a vertical plane, a hitch pole assembly operatively connected to said implement, each section including a frame, a plurality of ground working tools operatively mounted on said frame, means to raise and lower said tools relative to said frame, and at least one pair of castor wheel assemblies mounted in said frame for supporting said frame, means mounting said castor wheel assemblies in said frame, said means including a fore and aft beam pivotally mounted to the front and rear of said frame, said castor wheel assemblies being operatively connected one adjacent the front end of said fore and aft beam and other being operatively connected adjacent the rear end of said beam.

This construction has several advantages among which include reduced draft when compared to conventional types of chisel plows. The mounting of the cultivator shanks on rock shafts enables the sweep pitch to be accurately set independent of tillage depth and since draft is a function of sweep pitch, it is possible to operate this machine at minimum level required to achieve penetration. Furthermore, since the sweep or ground working tool is adjustable, the device is readily capable of penetration in hard soils.

Another advantage of the present device is the method of transport. The complexity of folding wings, winches and additional hydraulic systems is completely eliminated together with the elimination of overhead clearance problems and the possibility of falling wing sections which exists with conventional designs.

The implement achieves a much more uniform depth of tillage than conventional designs since the frames are flexible and each section is supported both at the front and rear by castor wheels so that tillage depth will not be influenced by tractor draw bar position since the draw pole itself is hinged relative to the main frame.

Also due to the castor wheel arrangement ment, the implement is more manoeuverable than conventional wing plows when negotiating tight turns when field working.

Another object of the invention is to provide a device of the character herewithin described in which wheel sinkage in wet soil is reduced as the design uses more wheels than is conventional and hence the additional tire contact area supporting the machine weight. Furthermore, if the machine does get stuck in a wet field, it is easier to free than a conventional wing plow or cultivator since the complete machine frame does not have to be lifted for the shanks to clear the soil, due to the mounting of the ground working implements upon a rock bar.

Another advantage of the invention is to provide a device of the character herewithin described which permits fabrication of virtually any desired width of machine by installation of additional sections. The simplicity of design also makes it possible to increase the width of machines already in the field by installation of additional sections as a field modification package. By contrast, the width of conventional cultivating implements of this type, is limited by transport problems due to the folding of the wings.

Another object of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE FIGURES

FIG. 1 is a top plan view of the implement with the hitch pole assembly in the working position.

FIG. 2 is an end elevation of FIG. 1 with the hitch pole assembly in the raised position.

In the drawings like characters of reference indicate corresponding parts in the different figures.

DETAILED DESCRIPTION

Figure 3:
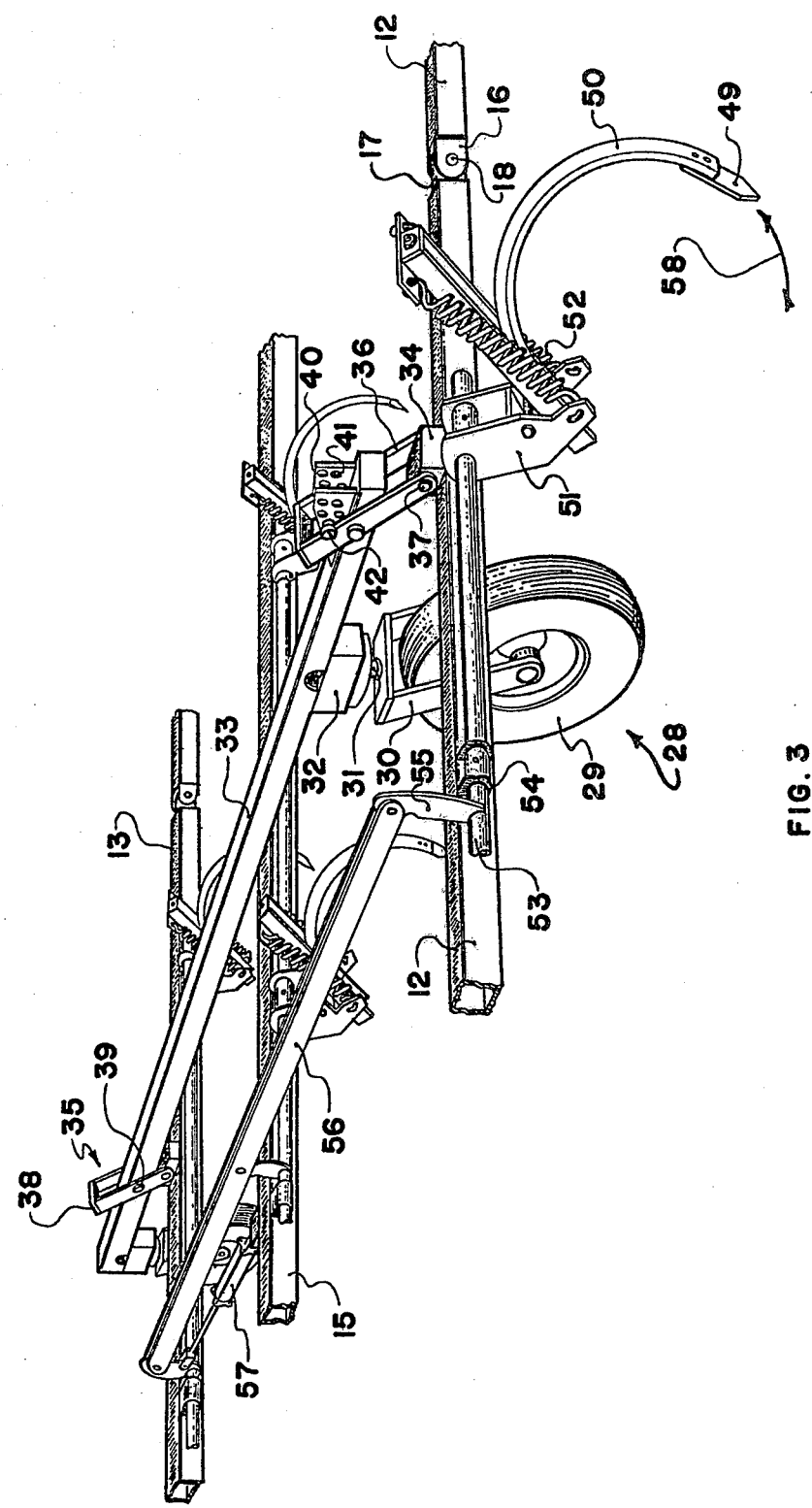
FIG. 3 is a fragmentary isometric view of a portion of the implement showing one of the wheel beams and the rock shaft actuating mechanism.

Proceeding therefore to describe the invention in detail, reference should first be made to FIG. 1 in which is shown a center section collectively designated 10 together with a plurality of wing sections 10A and 10B situated on either side of the center section 10. Although only five sections are shown, nevertheless it will be appreciated that the implement can consist of any number of sections as desired with preferably an equal number on each side of a center section. However, other arrangements can readily be designed without departing from the scope of the present invention.

Each section consists of a substantially rectangular frame 11 having a rear transverse chassis member 12 and a front transverse chassis member 13 with end chassis members 14 and a center transverse member 15, all of which form a substantially rigid rectangular frame.

One end member 14 of each frame is provided with pairs of lugs 16 and the other member is provided with a single lug 17 through which pivot pins 18 extend thus articulating the frames together for movement in a substantially vertical plane one relative to the other.

A hitch pole assembly is provided collectively designated 19 and consists, in this embodiment, of a central draft member 20 together with diagonal bracing members 21, all of which are hinged to the front chassis member 13 of the center section 10 so that they may pivot in a vertical arc from a down or working position as illustrated in FIG. 1, upwardly to a raised or towing position shown in FIG. 2. A conventional winch 19A or hydraulic means is provided for raising and lowering this hitch pole assembly.

This winch is mounted on a frame 19B extending upwardly from the center section 10 and driven by an hydraulic motor 19C operatively connected to the source of hydraulic fluid. A winch cable 19D extends from the winch to the hitch pole 20 and connects to a clevis 19E as shown in FIG. 2.

In order to reduce the height of the hitch pole assembly 19, when in the raised position, an articulated forwardly extending portion 22 is pivoted to the portion 20 as indicated by reference character 23 and this may be folded towards the portion 20 when the hitch pole is in the raised position. This portion 22 is provided with a conventional attaching means 24 at the front end thereof for attaching the hitch pole assembly to a source of power such as a tractor or the like (not illustrated).

The other cultivator or implement sections 10A and 10B are connected to adjacent the apex 25 of the hitch pole assembly 19 by means of a cable 26 extending around a sheave 27 mounted adjacent the apex 25 and being connected by the ends thereof to adjacent outer sections as clearly shown in FIG. 1, it being understood that the sheaves 27 permit equalization of the load to the hitch pole assembly 19. Additional frame members which may be attached outboard of the ones shown in FIG. 1, may also be attached to the hitch pole assembly by similar sheave and cable means previously described.

Figure 4:
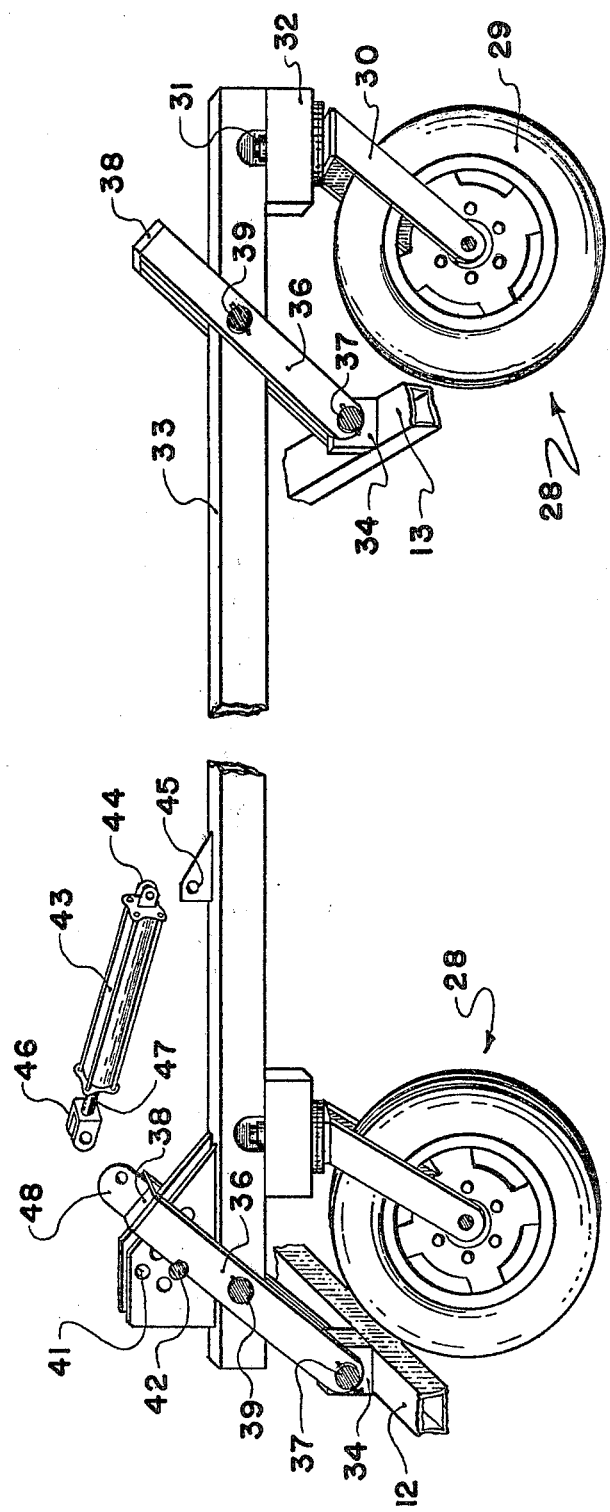
FIG. 4 is a partially isometric end elevation of one of the wheel mounting beams per se.

Each section 20, 10A, 10B, etc., is supported by pairs of ground engaging castor wheel assemblies collectively designated 28 and shown in detail in FIGS. 3 and 4. Each section 10, 10A, 10B, etc., is provided with two pairs of castor wheel assemblies adjacent and just inboard of the outer members 14 of the frames.

Each pair of castor wheel assemblies includes a ground engaging wheel 29 mounted within a castor wheel fork 30 terminating in a vertically situated pivot pin 31 which journals within a bearing block 32, said construction being substantially conventional.

The bearing blocks 32 are secured to a fore and aft beam 33 spanning the members 12, 13 and 15 and being pivotally attached to the front and rear members 13 and 12 as clearly shown in FIGS. 3 and 4.

A support block 34 is secured to the upper side of the members 12 and 13, and link assemblies 35 are provided and consist of a pair of spaced and parallel links or plates 36 pivotally secured by the lower ends thereof to the blocks 34 by means of pivot pins 37.

The links or plates 36 are maintained in their spaced apart relationship by the blocks 34 at the lower ends thereof and by means of a cross bar 38 spanning the upper ends thereof.

Pivot pins 39 extend through the links or plates 36 intermediate the ends thereof and through the fore and aft beam 33 adjacent each end thereof thus mounting the frame to the castor wheel assemblies 28 and supporting same as clearly shown.

These links or plates 36 incline upwardly and forwardly from the chassis or frame members 12 and 13 so that under normal transporting position, the frame will descend relative to the wheels until the cross bars 38 of the links 36, engage the upper side of the fore and aft beam 33 thus limiting the relative movement between the frame and the wheels, in one direction.

Means are provided to limit the relative movement in the other direction as will hereinafter be described and in one embodiment shown in FIGS. 3 and 4, said means includes a pair of plates 40 extending upwardly from the beam 33 adjacent the rear end thereof and having a plurality of apertures or drillings 41 formed therethrough.

A lock or stop pin 42 engages through any one of a plurality of the apertures 41 so that when the frame is lifted relative to the wheels, as will hereinafter be described, the links or plates 36 engage the extending ends of pins 42 and limit the relative movement in the other direction.

FIG. 4 shows an alternative arrangement which includes a fluid operator 43 being secured by one end 44 thereof to a lug 45 by means of a pivot pin (not illustrated) and by a clevis 46 secured to the piston rod 47 which in turn is pivotally connected to a lug 48 extending upwardly from the cross bar 38 of the links or plates 36 (this pivot pin is not illustrated in the drawings).

By connecting the fluid operator 43 to a source of hydraulic power on the towing vehicle (not illustrated), the fluid operator can be preset and maintained thus taking the place of the stop pin 42 hereinbefore described.

Dealing next with the ground working tools, in the present embodiment, the drawings shown chisel plow points 49 but, of course, other forms of cultivator such as duckfoot or shovels can be used.

These are mounted on curved shanks 50 held in shank holders 51 and being provided with a spring loaded trip mechanism 52 which is conventional. The shank holders 51 are secured to a transversely extending rock shaft 53 mounted within bearings 54 upon the chassis members 12, 13 and 15.

Reference to FIG. 3 will show a method of operating the rock shafts by the provision of arms or links 55 extending upwardly from the rock shafts and having a fore and aft link 56 pivotally connected to the upper ends of arms 55. A further fluid operator 57 is operatively connected between one of the arms 55 and the frame member 15 and is connected to the source of hydraulic power (not illustrated), so that extension and retraction of this fluid operator 57 will cause the shanks 50 together with the tools 49 to raise and lower relative to the ground.

It is desirable that the rock shafts of each frame section be provided with its own links 55, fore and aft link 56 and fluid operator 57. The fluid operators may be synchronized by conventional means.

This also means that the ground working tools 49 move in an arc indicated by arrow 58 so that the attitude of the chisel point 49 may be varied.

In the operation of the cultivator, the penetration of the chisel points or the equivalent 49 is controlled by the hydraulic operator 57 as is the attitude of the chisel point relative to the ground. When these working tools are lowered, with the device stationary, the frame is lifted thus rotating the links or plates 36 around pivot pins 39 until the cross bars 38 engage the upper side of the fore and aft beam 33. When the desired attitude and/or working position of the chisel plows 49 has been reached, pin 42 can be adjusted, if necessary, and placed in the desired apertures 41.

When the implement is then moved forwardly, the points 49 dig into the ground and cause the links or plates 36 to rotate in the opposite direction until they strike the stop pins 42 thus controlling the depth and attitude of the cultivator points or equivalent 49. Alternatively, the hydraulic pperator 43 can be used and maintains the points in the desired position and attitude. The stop pins 42 or the hydraulic actuator 43 acts as a depth control and the individual frames are permitted to flex due to the conventional clevis connections therebetween hereinbefore described.

It should be stressed that the engagement of the links 36 with the stop pins 42 controls the depth of operation of the shovels or points 49 and maintains this depth regardless of the type of soil through which the device is operating.

Also it should be observed that the conventional trip mechanism 52 operates if an obstruction is reached with the springs returning the tool to the original position after the obstruction has been passed.

The mounting of the castor wheel assemblies gives a flexibility to the frame so that individual sections may flex within limits due to unevenness of land.

When it is desired to transport the implement, the hydraulic actuator 57 is actuated to raise the cultivating tools 49 clear of the ground thus permitting the frame to lower until the cross bars 38 strike the fore and aft beam 33 thus stabilizing the frame.

The forward extension 22 is unpinned and folded whereupon the pole hitch is elevated either hydraulically or by hand winch and secured in the position illustrated in FIG. 2.

A conventional type hitch 59 is pivotally secured to clevis 60 on one end member 14 of the outermost section 10B, etc., and this is normally in the raised position shown in FIG. 2, when the implement is working.

However, when it is desired to transport the implement, this hitch is lowered and attached to a tractor whereupon the implement can be pulled lengthwise in the direction of arrow 61 in contradistinction to the working direction illustrated by arrow 62.

Under these circumstances, the castor wheels align with the direction of travel and when in the transport position 61, it is desirable to lock the castor wheels of the center section in the direction of arrow 61, a simple pin lock (not illustrated) being used. This prevents any untoward crabbing or sideways movement of the implement during the towing action.

The rearwardly extending ground engaging shanks 50 may overhang the ditch during transport, once again reducing the effective width of the machine and enabling same to be transported along the road allowances, roads and the like.

Figure 5:
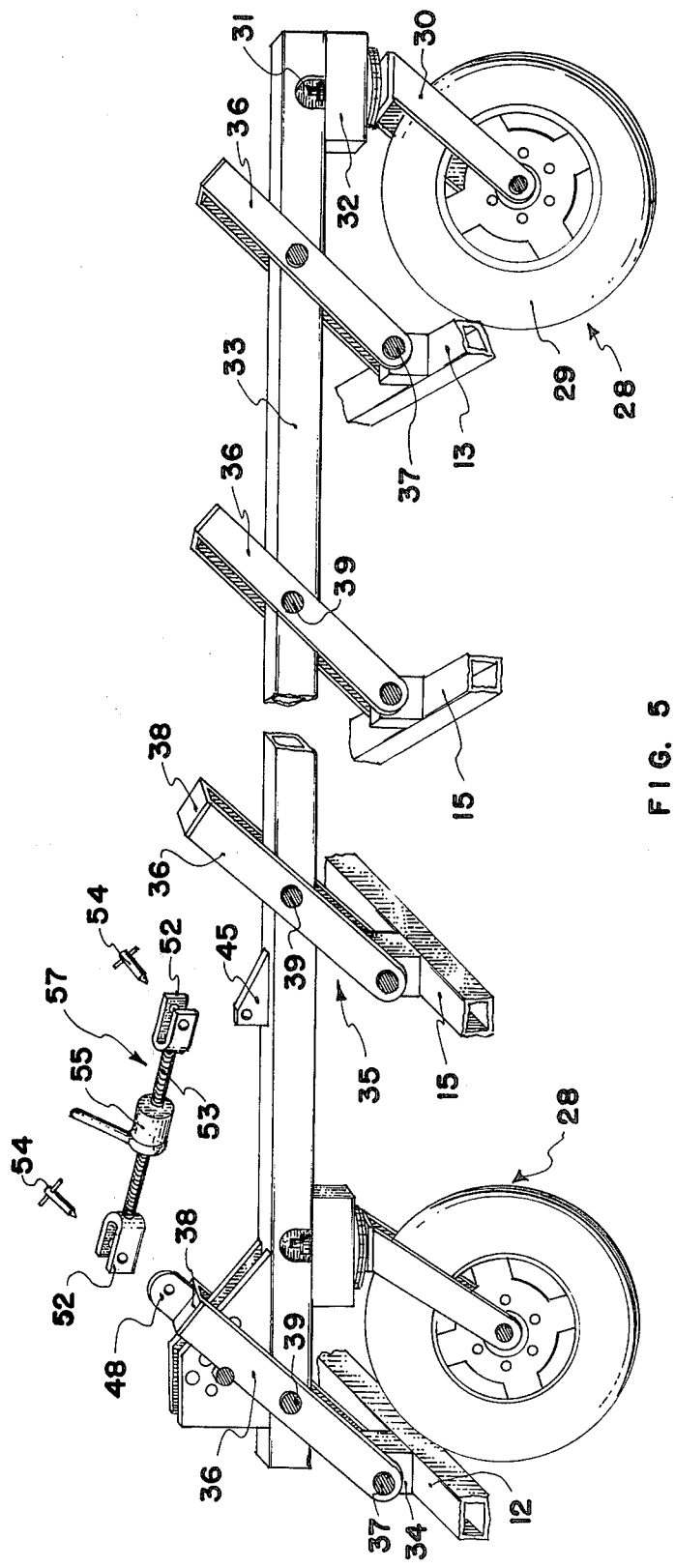
FIG. 5 is a view similar to FIG. 4, but showing a further embodiment thereof.

FIG. 5 shows the preferred embodiment which is similar to FIG. 4 in basic concept with the exception that a pair of members 15 are provided each mounting the fore and aft beam 33 by means of link assemblies 35 in a manner similar to those hereinbefore described so that in this particular embodiment, three such assemblies are situated between the castor wheel assemblies 28.

Instead of the hydraulic piston and cylinder assembly 43, a mechanical jack assembly 51 is provided extending between lugs 45 and 48 and comprising clevises 52 secured to jack shaft 53 and being pin connected to the lugs 45 and 48 by means of pins 54 engaging through apertures in the clevises 52 and through the lugs as clearly shown.

The ratchet type adjuster 55, which is conventional, engages the jack shaft and retracts or extends the clevises relative to one another thereby presetting the necessary adjustment mechanically.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A ground working implement comprising in combination a center section and at least two further sections articulately connected one upon each side of said center section for relative movement one with the other in at least a vertical plane, a hitch pole assembly operatively connected to said implement, each section including a generally rectangular frame, a plurality of ground working tools operatively mounted on said frame, means to raise and lower said tools relative to said frame, and at least one pair of castor wheel assemblies mounted on said frame for supporting said frame, means mounting said castor wheel assemblies to said frame, said means including a fore and aft beam pivotally mounted to the front and rear of said frame, said castor wheel assemblies being operatively connected one adjacent the front end of said fore and aft beam and the other being operatively connected adjacent the rear end of said beam, link means pivotally mounting said beam to said frame for generally vertical movement of said frame, means to pivot said link means and further means to limit the pivotal movement of said link means relative to said frame.

2. The implement according to claim 1 in which said means to pivotally mount said beam to said frame includes links pivotally connected by one end thereof to said frame and by adjacent the other end thereof to said beam.

3. The implement according to claim 2 in which said means to limit the movement of said beam relative to said frame includes means on said links engaging said beam thereby limiting the movement of said beam in one direction, pin support means extending from said beam, and a pin engageable through said support means in any one of a plurality of positions and being engaged by said links thereby limiting the movement of said beam in the other direction.

4. The implement according to claim 2 which includes a fluid operator extending between the other end of said links and said beam, and means to adjust and preset the position of said fluid operator thereby presetting and maintaining the relative position of said beam relative to said frame.

5. The implement according to claim 2 which includes a mechanical jack assembly extending between the other end of said links and said beam, and means to adjust and preset the position of said mechanical jack assembly thereby presetting and maintaining the relative position of said beam relative to said frame.

6. The implement according to claim 1 in which said means to raise and lower said tools relative to said frame includes a rock shaft, ground working tools secured to said rock shaft and fluid operator means to rotate said rock shaft whereby said ground working tools rotate in an arc thereby varying the attitude of said tools relative to the ground.

7. The implement according to claim 2 in which said means to raise and lower said tools relative to said frame includes a rock shaft, ground working tools secured to said rock shaft and fluid operator means to rotate said rock shaft whereby said ground working tools rotate in an arc thereby varying the attitude of said tools relative to the ground.

8. The implement according to claim 3 in which said means to raise and lower said tools relative to said frame includes a rock shaft, ground working tools secured to said rock shaft and fluid operator means to rotate said rock shaft whereby said ground working tools rotate in an arc thereby varying the attitude of said tools relative to the ground.

9. The implement according to claim 4 in which said means to raise and lower said tools relative to said frame includes a rock shaft, ground working tools secured to said rock shaft and fluid operator means to rotate said rock shaft whereby said ground working tools rotate in an arc thereby varying the attitude of said tools relative to the ground.

10. The implement according to claim 5 in which said means to raise and lower said tools relative to said frame includes a rock shaft, ground working tools secured to said rock shaft and fluid operator means to rotate said rock shaft whereby said ground working tools rotate in an arc thereby varying the attitude of said tools relative to the ground.

11. The implement according to claims 1, 2 or 3 which includes means to raise and lower said hitch pole assembly from a working position to a storage position and vice-versa, and a towing hitch pivotally secured to one end of said implement, said towing hitch being raised and lowered from a storage position to an implement towing position and vice-versa, said castor wheel assemblies aligning with the direction of travel of said implement in the working position and aligning with the direction of travel of said implement when in the towing position.

12. The implement according to claims 4, 5 or 6 which includes means to raise and lower said hitch pole assembly from a working position to a storage position and vice-versa, and a towing hitch pivotally secured to one end of said implement, said towing hitch being raised and lowered from a storage position to an implement towing position and vice-versa, said castor wheel assemblies aligning with the direction of travel of said implement in the working position and aligning with the direction of travel of said implement when in the towing position.

13. The implement according to claims 7, 8 or 9 which includes means to raise and lower said hitch pole assembly from a working position to a storage position and vice-versa, and a towing hitch pivotally secured to one end of said implement, said towing hitch being raised and lowered from a storage position to an implement towing position and vice-versa, said castor wheel assemblies aligning with the direction of travel of said implement in the working position and aligning with the direction of travel of said implement when in the towing position.

14. The implement according to claim 10 which includes means to raise and lower said hitch pole assembly from a working position to a storage position and vice-versa, and a towing hitch pivotally secured to one end of said implement, said towing hitch being raised and lowered from a storage position to an implement towing position and vice-versa, said castor wheel assemblies aligning with the direction of travel of said implement in the working position and aligning with the direction of travel of said implement when in the towing position.

* * * * *